UNITED STATES PATENT OFFICE.

THOMAS DANA AND ZECHARIAH B. STUART, OF MANCHESTER, N. H.

IMPROVEMENT IN COMPOSITION PAINT FOR COATING ROOFS.

Specification forming part of Letters Patent No. 182,175, dated September 12, 1876; application filed May 27, 1876.

*To all whom it may concern:*

Be it known that we, THOMAS DANA and ZECHARIAH B. STUART, of Manchester, Hillsborough county, New Hampshire, have invented a new and Improved Roofing Compound, of which the following is a specification:

Our invention relates to that class of compounds used in coating roofs and other surfaces for the purpose of rendering them waterproof; and consists in the combination of gutta-percha, isinglass, chloroform, rosin, and japan and asphaltum varnish, with or without the addition of common salt and coal-ashes.

To prepare our roofing compound, we take four ounces of gutta-percha and one ounce of isinglass, and cut them in two pounds of chloroform. To this we add one gallon of japan varnish and one gallon of asphaltum varnish, (which is made by cutting asphaltum in turpentine,) and four ounces of pulverized rosin, drop-black, or any other pigment may be introduced to give the compound the desired color. These ingredients are thoroughly mixed, and applied with a brush, and before it becomes dry a mixture of one bushel of coal-ashes and one quart of fine common salt is sifted over the surface and rolled in. This process is repeated until the desired thickness is obtained.

For many purposes the compound may be applied to advantage without the addition of ashes and salt.

This compound may be used as a waterproof coating for any purpose. It is not affected by heat or cold, and is light and durable.

Having thus described our invention, we claim as new and desire to secure by Letters Patent—

A composition of matter consisting of gutta-percha, isinglass, chloroform, and rosin, japan and asphalt varnish, as set forth.

THOMAS DANA.
ZECHARIAH B. STUART.

Witnesses:
GEO. W. MORRISON,
ROLAND ROWELL.